United States Patent
Li et al.

(10) Patent No.: US 8,246,027 B2
(45) Date of Patent: Aug. 21, 2012

(54) CLAMP APPARATUS

(75) Inventors: Shen-Chun Li, Taipei Hsien (TW); Shou-Kuo Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 346 days.

(21) Appl. No.: 12/606,112

(22) Filed: Oct. 26, 2009

(65) Prior Publication Data

US 2010/0314817 A1  Dec. 16, 2010

(30) Foreign Application Priority Data

Jun. 12, 2009  (CN) .......................... 2009 1 0303201

(51) Int. Cl.
*B25B 1/20* (2006.01)
*B25B 1/06* (2006.01)
*B25B 1/16* (2006.01)
*B25B 1/08* (2006.01)
*B25B 5/08* (2006.01)
*B25B 1/10* (2006.01)
*B25B 5/10* (2006.01)
*B23Q 3/18* (2006.01)

(52) U.S. Cl. .......... 269/225; 269/43; 269/226; 269/229; 269/231; 269/242; 269/246; 269/61

(58) Field of Classification Search .................... 269/43, 269/442, 226, 229, 231, 240, 242, 246, 61; 294/119.1, 88
See application file for complete search history.

(56) References Cited

U.S. PATENT DOCUMENTS

| | | | | |
|---|---|---|---|---|
| 3,635,514 A * | 1/1972 | Blatt | ............................. | 294/106 |
| 3,952,880 A * | 4/1976 | Hill et al. | ........................... | 414/5 |
| 4,351,553 A * | 9/1982 | Rovetta et al. | ................ | 294/106 |
| 4,579,380 A * | 4/1986 | Zaremsky et al. | ......... | 294/119.1 |
| 4,600,357 A * | 7/1986 | Coules | ........................... | 414/730 |
| 4,894,103 A * | 1/1990 | Bailey | ........................... | 156/111 |
| 4,900,078 A * | 2/1990 | Bloch | ........................... | 294/86.4 |
| 6,592,324 B2 * | 7/2003 | Downs et al. | ................. | 414/741 |
| 6,932,557 B2 * | 8/2005 | Downs et al. | ................. | 414/741 |
| 7,044,706 B2 * | 5/2006 | Jung | ............................. | 414/737 |

\* cited by examiner

*Primary Examiner* — Monica Carter
*Assistant Examiner* — Seahee Yoon
(74) *Attorney, Agent, or Firm* — Altis Law Group, Inc.

(57) ABSTRACT

A clamping apparatus includes a motor, a first cone gear secured to a shaft of the motor, and two clamping bodies attached to opposite sides of the motor. Each of the clamping bodies includes a second cone gear meshing with the first, a threaded post fixed to the second cone gear, a carriage threadedly connected with the threaded post, and a clamp arm fixed to the carriage. The motor rotates the first cone gear, and in turn the second cone gears and the corresponding threaded posts. With the rotation of the threaded posts, the carriages move towards or away from each other, whereby the clamp arms cooperatively acquire an object between the clamp arms, or release the object therefrom.

15 Claims, 4 Drawing Sheets

CLAMP APPARATUS

BACKGROUND

1. Technical Field

The present disclosure relates to a clamp apparatus for retrieving an object.

2. Description of the Related Art

Mechanical arms are widely used in manufacturing, to retrieve products or tools. For example, in testing of printed circuit boards (PCBs), mechanical arms retrieve and precisely position detection rods on the PCBs, increasing accuracy and efficiency of testing. However, a clamp apparatus operable at an end of a mechanical arm is usually pneumatic or hydraulic with associated complex circuit structure. Maintenance of the pneumatic or hydraulic circuit structure is time and labor consuming.

DETAILED DESCRIPTION

Figure 1:
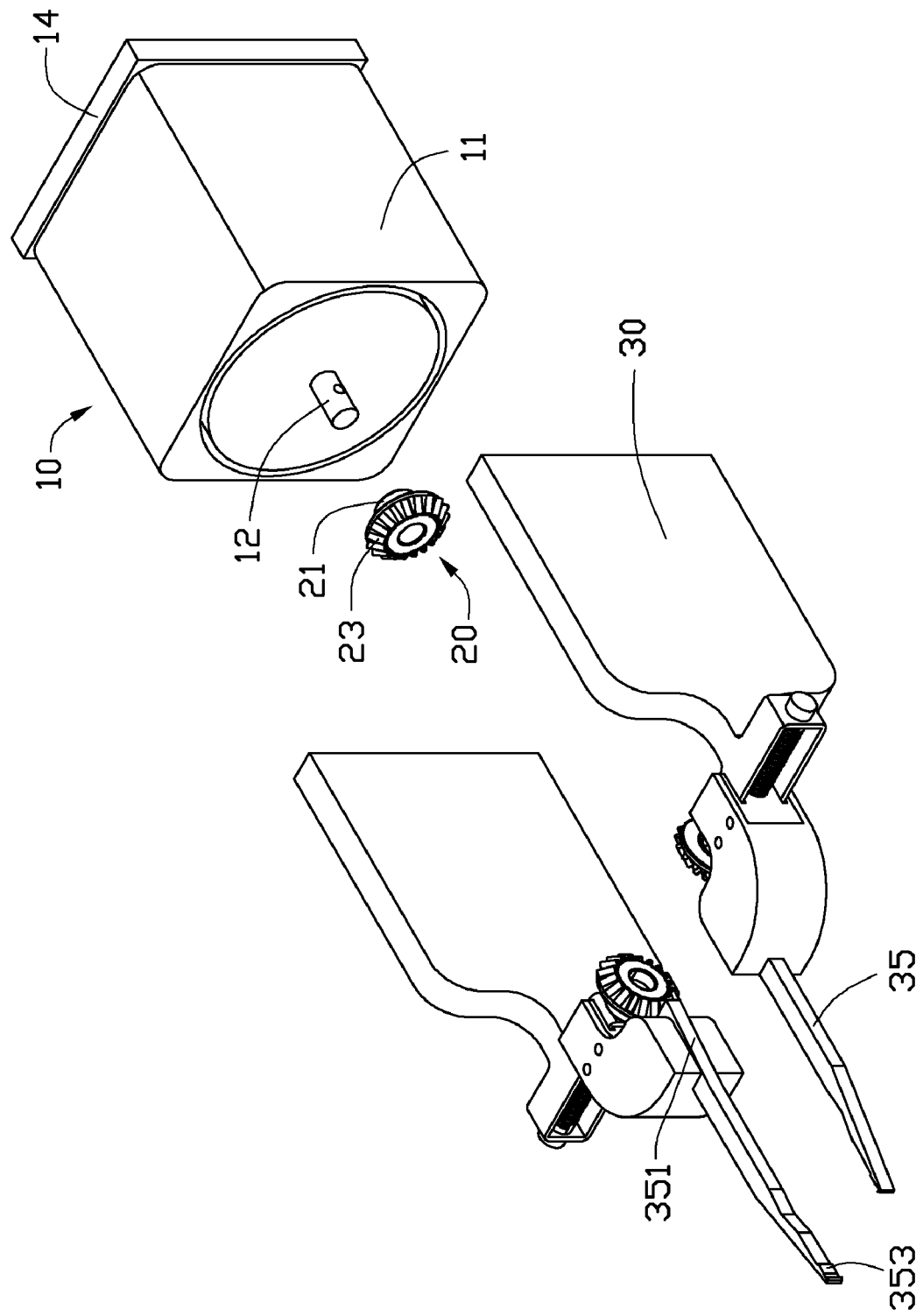
FIG. 1 is an exploded, isometric view of an exemplary embodiment of a clamp apparatus including two clamp bodies.

Referring to FIG. 1, in an exemplary embodiment, a clamp apparatus includes a motor 10, a driving member 20, and two clamp bodies 30.

The motor 10 includes a main body 11, a shaft 12 extending from a first end of the main body 11, and a mount 14 attached to a second end opposite to the first end of the main body 11.

The driving member 20 includes a first cone gear 23 and a cylindrical fixing portion 21 extending from a side of the first cone gear 23. A mounting hole (not shown) is axially defined in the fixing portion 21.

Figure 2:
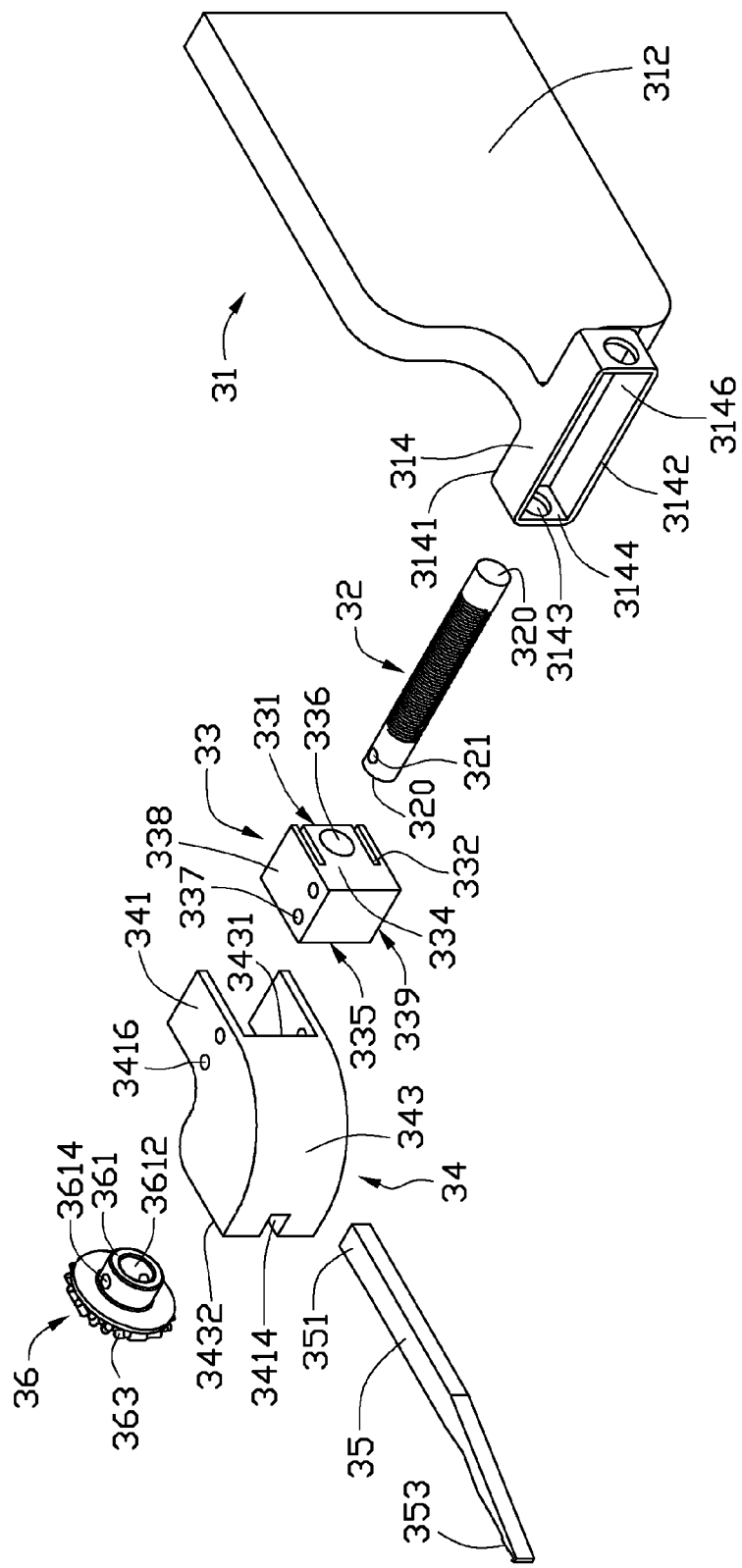
FIG. 2 is an exploded, enlarged view of one of the clamp bodies of FIG. 1.

Referring to FIG. 2, each of the clamp bodies 30 includes a mounting bracket 31, a threaded post 32, a carriage 33, a connecting member 34, a clamp arm 35, and a driven member 36. The mounting bracket 31 includes an attachment plate 312 and a coupling portion 314 connected to the attachment plate 312. The coupling portion 314 is a rectangular hollow bar, and includes a first sidewall 3141 integrally formed with an end of the attachment plate 312, two second sidewalls 3142 respectively extending perpendicular from opposite sides of the first sidewall 3141, and two end walls 3144 respectively extending perpendicular from opposite ends of the first sidewall 3141. Two pivot holes 3143 are respectively defined in the end walls 3144 and aligned with each other. A receiving space 3146 is bound by the first sidewall 3141, the second sidewalls 3142, and the end walls 3144. A securing hole 321 is defined in the threaded post 32 adjacent to one of opposite ends 320 of the threaded post 32. The carriage 33 is a cubic block, and includes a first wall 331, a second wall 334 perpendicularly connected to a first side of the first wall 331, a third wall 335 parallel to the second wall 334 and perpendicularly connected to a second side opposite to the first side of the first wall 331, a top wall 338 perpendicularly connected to tops of the first to third walls 331, 334 and 335, and a bottom wall 339 perpendicularly connected to bottoms of the first to third walls 331, 334, and 335. Two parallel sliding slots 332 are defined in the first wall 331, through the second wall 334 and the third wall 335. The second wall 334 defines a threaded hole 336. Each of the top and bottom walls 338 and 339 of the carriage 33 defines a pair of fastener holes 337, away from the first wall 331. The connecting member 34 includes a curved elbow portion 343 and two parallel connecting pieces 341 extending from a first end 3431 of the elbow portion 343. A retaining groove 3414 is defined in a second end 3432 of the elbow portion 343. Each of the connecting pieces 341 defines a pair of fastening holes 3416, adjacent to the elbow portion 343. The clamp arm 35 includes a mounting portion 351 extending from a first end thereof. A plurality of teeth 353 is formed on a side of the clamp arm 35, adjacent to a second end opposite to the mounting portion 351 of the clamp arm 35. The driven member 36 includes a second cone gear 363 and a cylindrical fixing portion 361 extending from a side of the second cone gear 363. A mounting hole 3612 is axially defined in the fixing portion 361. A securing hole 3614 is defined in a circumference of the fixing portion 361, communicating with the mounting hole 3612.

In assembly of each of the clamp bodies 30, the clamp arm 35 is connected to the connecting member 34, with the mounting portion 351 of the clamp arm 35 engaging the retaining groove 3414 of the elbow portion 343 of the connecting member 34. The carriage 33 is sandwiched between the connecting pieces 341, and retained to the connecting pieces 31 with two pairs of fasteners (not labeled) correspondingly passing through the corresponding pairs of fastening holes 3416 of the connecting pieces 31 and engaging the corresponding pairs of fastener holes 337 of the carriage 33. The second sidewalls 3142 of the coupling portion 314 of the mounting bracket 31 are correspondingly received in the sliding slots 332 of the carriage 33 through the first wall 331, at the same time, a portion between the sliding slots 332 of the carriage 33 is received in the receiving space 3146 of the coupling portion 314, rendering carriage 33 slidable between the end walls 3144 along the second sidewalls 3142. The threaded hole 336 of the guiding portion 334 of the carriage 33 aligns with the pivot holes 3143 of the coupling portion 314. The threaded post 32 passes through the pivot holes 3143 of the coupling portion 314 and engages the threaded hole 336 of the carriage 33. The end 320 of the threaded post 32 near the securing hole 321 engages the mounting hole 3612 of the fixing portion 361 of the driven member 36, a pin is received in the securing hole 3614 of the fixing portion 361 and engages the securing hole 321 of the threaded post 32, to secure the driven member 36 to the threaded post 32.

Figure 3:
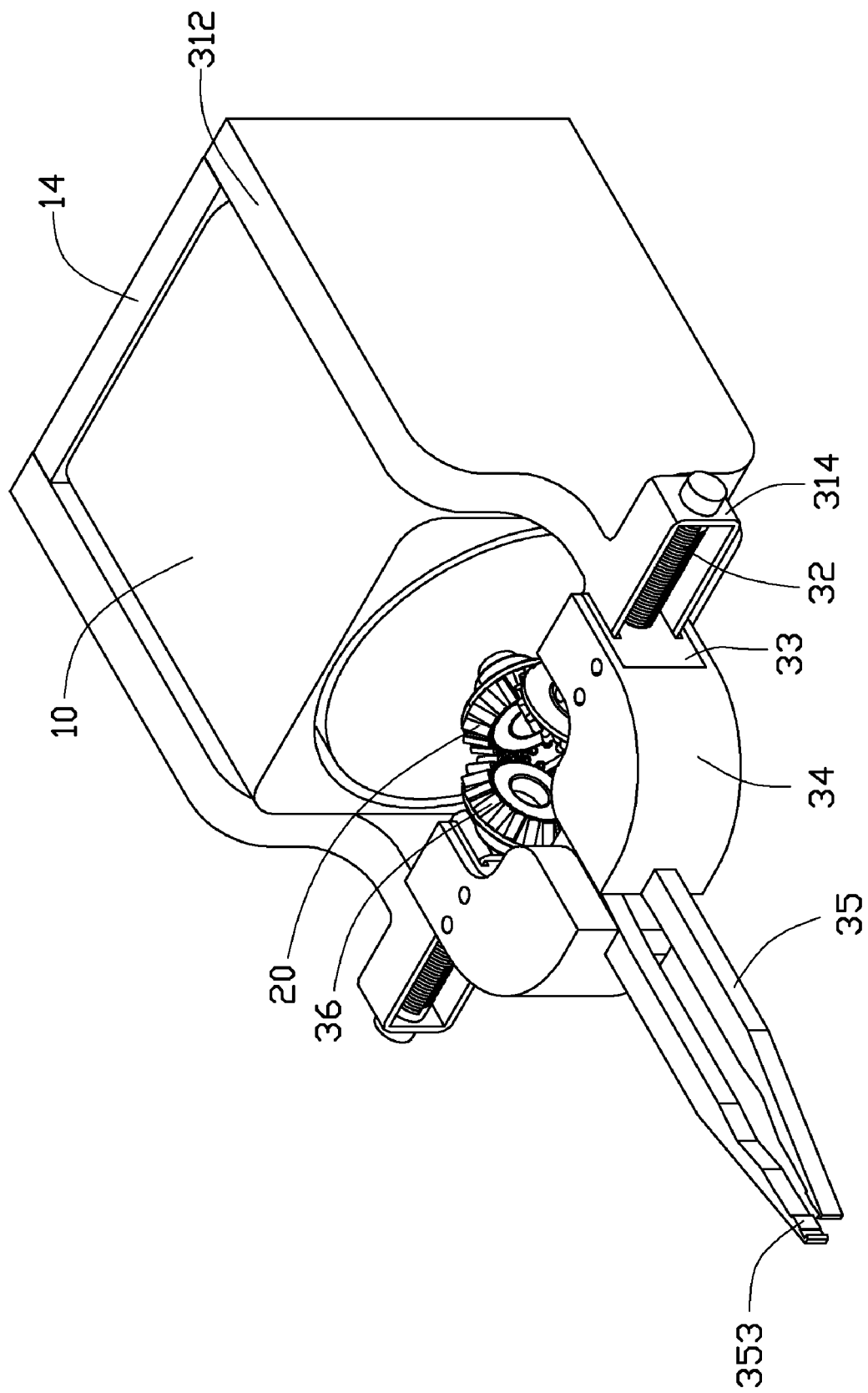
FIG. 3 is assembled, isometric view of the clamp apparatus of FIG. 1.
Figure 4:
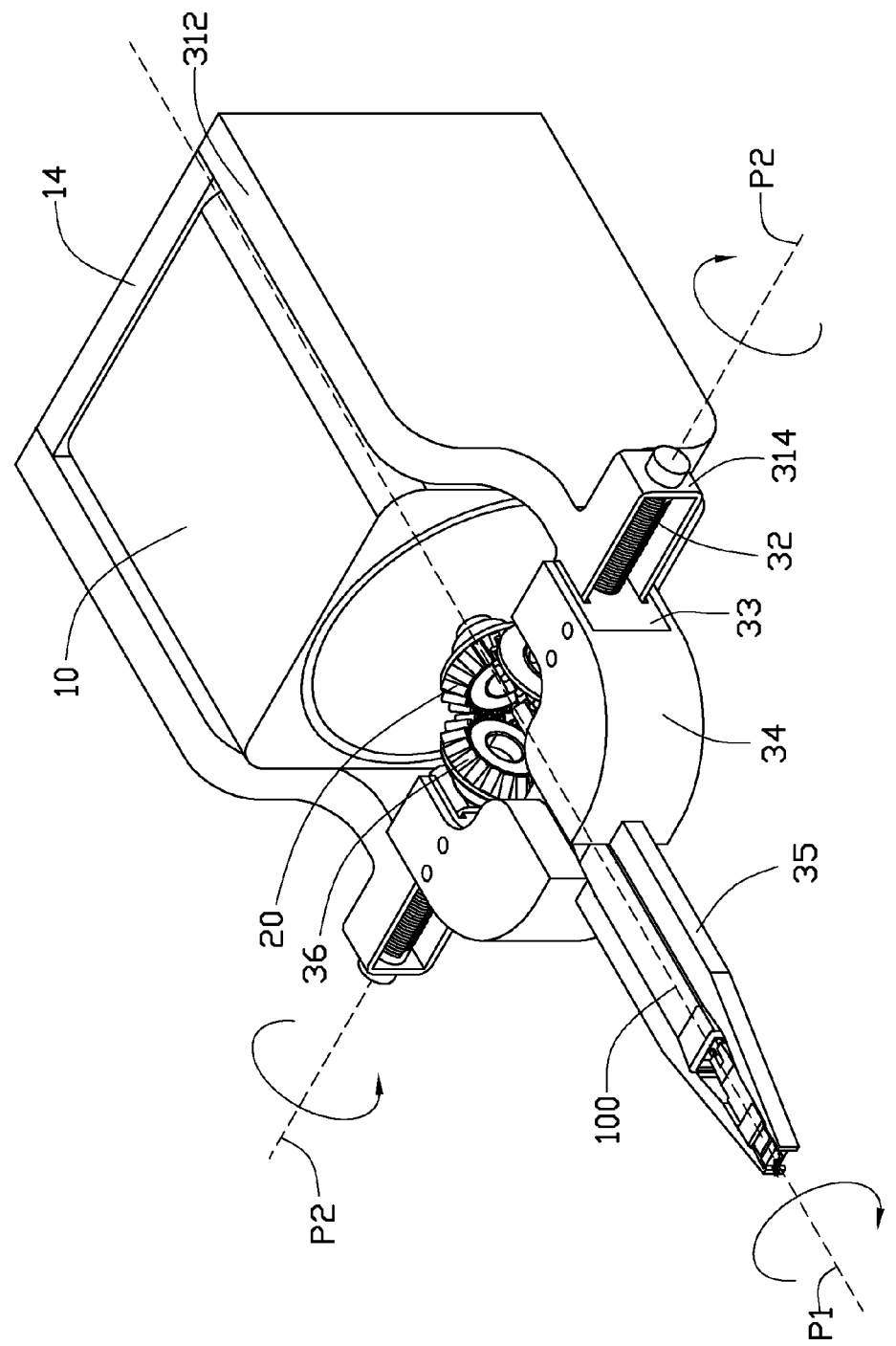
FIG. 4 is similar to FIG. 3, but shows the clamp apparatus clamping a detection rod.

Referring to FIGS. 3 and 4, in assembly, the driving member 20 is retained to the motor 10, with the shaft 12 of the motor 10 fixed in the mounting hole of the fixing portion 21 of the driving member 20. The attachment plates 312 of the clamp bodies 30 abut opposite sides of the motor 10, with the sides forming the plurality of teeth 353 of the clamp arms 35 of the clamp bodies 30 facing each other. Fastening members, such as fasteners, are provided to fix the attachment plate 312 of the clamp bodies 30 to the mount 14 of the motor 10. At the same time, the second cone gears 363 of the driven members 36 of the clamp bodies 30 mesh with the first cone gear 23 of driving member 20, with rotating axes P2 of the driven members 36 perpendicular to a rotating axis P1 of the driving member 20.

Referring to FIG. 4, in one embodiment, the clamp apparatus is provided to clamp a detection rod 100. To clamp the detection rod 100, the motor 10 is powered on to rotate the driving member 20 in a first direction, whereby the driven members 36 together with the corresponding threaded posts 32 of the clamp bodies 30 reversely rotate by meshing of the first cone gear 23 and the second cone gears 363 of the driven members 36. With rotation of the threaded posts 32, the carriages 33 of the clamp bodies 30 slide away from each other, such that clamp arms 35 of the clamp bodies 33 move with the carriages 33 away from each other. The motor 10 is stopped when a distance between the clamp arms 35 is wide enough to accommodate the detection rod 100 between the clamp arms 35. The clamp apparatus is moved to acquire the detection rod 100 between the clamp arms 35. The motor 10 is powered on to drive the driving member 20 to rotate in a second direction opposite to the first direction, whereby the driven members 36 together with the corresponding threaded posts 32 of the clamp bodies 30 are rotated back, and the carriages 33 of the clamp bodies 30 slide towards each other. The clamp arms 35 of the clamp bodies 33 move with the carriages 33 towards each other to sandwich the detection rod 100. The plurality of teeth 353 of the clamp arms 35 abut opposite sides of the detection rod 100 to enhance a friction force between the clamp arms 35 and the detection rod 100, thereby preventing the detection rod 100 from sliding away from the clamp arms 35.

It is believed that the present embodiment and its advantages will be understood from the foregoing description, and it will be apparent that various changes may be made thereto without departing from the spirit and scope of the description or sacrificing all of its material advantages, the example hereinbefore described merely being exemplary embodiments.

What is claimed is:

1. A clamp apparatus to clamp an object, the clamp apparatus comprising:
    a motor comprising a shaft;
    a first cone gear secured to the shaft of the motor; and
    two clamp bodies, each comprising a mounting bracket fixed to the motor, a threaded post pivotably mounted to the mounting bracket, a second cone gear secured to the threaded post and meshing with the first cone gear, a carriage slidably attached to the mounting bracket and defining a threaded hole engaging the threaded post, and a clamp arm connected to the carriage;
    wherein the motor rotates the first cone gear, and, in turn, the second cone gears and the corresponding threaded posts of the clamp bodies, such that the carriages slide along the corresponding threaded posts to move the corresponding clamp arms towards each other to clamp the object between the clamp arms, or to move away from each other to release the object;
    wherein each of the clamp bodies further comprises a connecting member engaging the carriage and the clamp arm; and
    wherein each of the connecting members comprises an elbow portion and two parallel connecting pieces extending from a first end of the elbow portion, and each of the carriages is sandwiched between the connecting pieces of the corresponding connecting member.

2. The clamp apparatus of claim 1, wherein the mounting bracket of each of the clamp bodies comprises an attachment plate attached to opposite sides of the motor, and a coupling portion pivotably engaging the threaded post.

3. The clamp apparatus of claim 2, wherein each of the coupling portions comprises two opposite end walls, each defining a pivot hole, wherein opposite ends of the corresponding threaded post are pivotably received in the pivot holes of the coupling portion, and each of the carriages slides between the end walls of the corresponding coupling portion.

4. The clamp apparatus of claim 3, wherein each of the carriages defines two parallel sliding slots, each of the coupling portions comprises two opposite sidewalls perpendicularly connected between the end walls of the coupling portion, and the sidewalls of each of the coupling portions are slidably received in the corresponding sliding slots of the corresponding carriage.

5. The clamp apparatus of claim 2, wherein the motor comprises a mount, to opposite sides of which the attachment plates of the mounting brackets are retained.

6. The clamp apparatus of claim 1, wherein each of the elbow portions defines a retaining groove in a second end of the elbow portion, each of the clamp arms forms a mounting portion retained in the retaining groove of the corresponding elbow portion.

7. The clamp apparatus of claim 1, wherein each of the clamp arms forms a plurality of teeth on a side facing the other clamp arm.

8. The clamp apparatus of claim 1, wherein rotating axes of the second cone gears are perpendicular to a rotating axis of the first cone gear.

9. A clamp apparatus provided for clamping an object, the clamp apparatus comprising:
    a motor comprising a shaft;
    a driving member secured to the shaft of the motor and rotatable with the shaft of the motor; and
    two clamp bodies connected to the motor, each comprising a clamp arm, at least one of the two clamp bodies further comprising a mounting bracket fixed to the motor, a driven member rotatably mounted to the mounting bracket and engaging the driving member, and a threaded post secured to the driven member and slidably connected to the clamp arm of the at least one clamp body;
    wherein the motor rotates the driving member, and, in turn, the driven member and the threaded post of the at least one clamp body, whereby the clamp arm of the at least one of the clamp bodies slides along the threaded post in response to the rotation of the threaded post, moving the clamp arm of the at least one of the clamp bodies towards the other one of the clamp bodies to sandwich the object between the clamp arms, or away from the other one of the clamp bodies to release the object;
    wherein the at least one of the clamp bodies further comprises a carriage fixed to the clamp arm thereof, and defining a threaded hole engaging the threaded post;
    wherein the mounting bracket of the at least one of the clamp bodies comprises an attachment plate attached to a side of the motor, and a coupling portion engaging the threaded post and the carriage; and
    wherein the carriage defines two parallel sliding slots slidably engaging two opposite sidewalls of the coupling portion.

10. The clamp apparatus of claim 9, wherein the driving member comprises a first cone gear meshing with a second cone gear of the driven member.

11. The clamp apparatus of claim 9, wherein the at least one clamp body further comprises a connecting member engaging the carriage and the clamp arm of the clamp body.

12. The clamp apparatus of claim 11, wherein the connecting member comprises an elbow portion and two parallel connecting pieces extending from a first end of the elbow portion and sandwiching the carriage therebetween.

13. The clamp apparatus of claim 12, wherein the elbow portion defines a retaining groove in a second end of the elbow portion, the clamp arm of the at least one clamp body forms a mounting portion retained in the retaining groove of the elbow portion.

14. The clamp apparatus of claim 9, wherein each of the clamp arms forms a plurality of teeth on a side facing the other clamp arm.

15. The clamp apparatus of claim 10, wherein a rotating axis of the second cone gear is perpendicular to a rotating axis of the first cone gear.

* * * * *